United States Patent [19]

Tsuda et al.

[11] Patent Number: 5,726,673
[45] Date of Patent: Mar. 10, 1998

[54] LIQUID CRYSTAL DISPLAY FOR LASER MARKER

[75] Inventors: Yukihiro Tsuda; Yoshinori Saito; Akira Mori, all of Kanagawa, Japan

[73] Assignee: Kabushiki Kaisha Komatsu Seisakusho, Tokyo, Japan

[21] Appl. No.: 432,186

[22] PCT Filed: Nov. 10, 1993

[86] PCT No.: PCT/JP93/01637

§ 371 Date: May 9, 1995

§ 102(e) Date: May 9, 1995

[87] PCT Pub. No.: WO94/11147

PCT Pub. Date: May 26, 1994

[30] Foreign Application Priority Data

Nov. 11, 1992 [JP] Japan .................. 4-326073
Nov. 26, 1992 [JP] Japan .................. 4-317343

[51] Int. Cl.⁶ .................................................. G09G 3/36
[52] U.S. Cl. ......................... 345/87; 345/94; 345/103
[58] Field of Search ........................... 345/87, 103, 94

[56] References Cited

U.S. PATENT DOCUMENTS

| | | | |
|---|---|---|---|
| 4,679,043 | 7/1987 | Morokawa | 345/103 |
| 4,778,260 | 10/1988 | Okada et al. | 345/103 |
| 5,363,117 | 11/1994 | Matsuura et al. | 345/87 |
| 5,432,461 | 7/1995 | Henley | 345/87 |
| 5,473,339 | 12/1995 | Kanatani et al. | 345/87 |

Primary Examiner—Richard Hjerpe
Assistant Examiner—Juliana S. Kim
Attorney, Agent, or Firm—Diller, Ramik & Wight, PC

[57] ABSTRACT

A liquid crystal display for a laser marker for attaining a higher marking speed, characterized in that a liquid crystal display screen (10) is divided into a first zone (10a) where a sub-scanning is first performed and a second zone (10b) where a sub-scanning is performed following the first zone (10a) sub-scanning, that switching of display is performed independently for each of the first and second zones (10a, 10b), and predetermined voltages are applied, respectively, to row and column electrodes after those row and column electrodes are grounded, whereby display switching processing can be performed independently for each of the first and second zones. Completion of the sub-scanning of the first zone (10a) is detected by a position detecting means, and when such a detection is done, switching of display in the first zone (10a) is independently performed. In addition, when the position detecting means detects the completion of sub-scanning of the second zone (10b), switching of display in the second zone (10b) is performed independently.

3 Claims, 4 Drawing Sheets

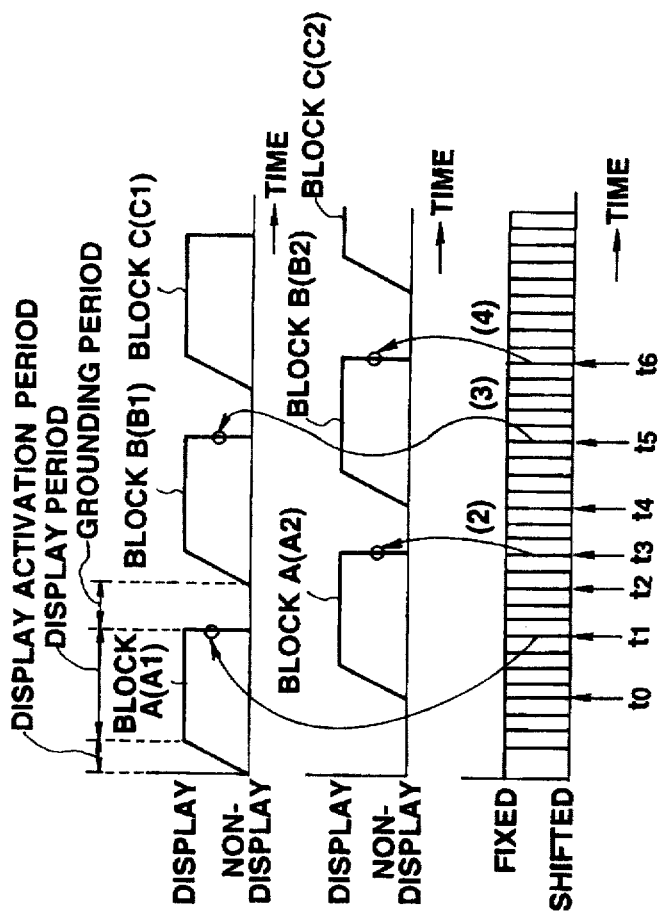
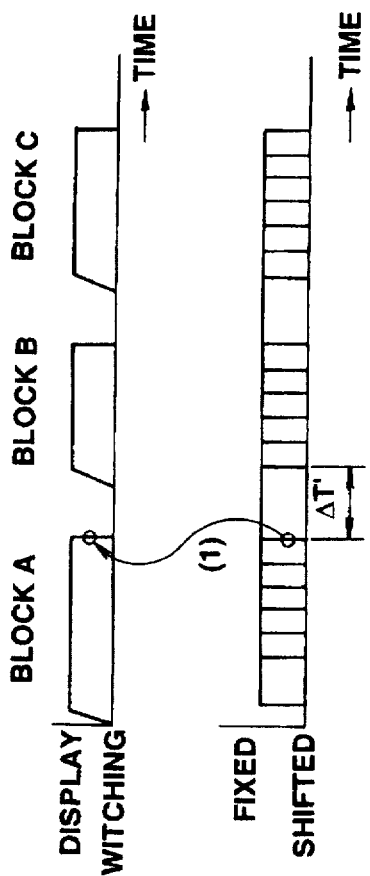
FIG. 4(a) LIQUID CRYSTAL MASK UPPER PART DISPLAY
FIG. 4(b) LIQUID CRYSTAL MASK LOWER PART DISPLAY
FIG. 4(c) Y DEFLECTION MIRROR
FIG. 6(a) (PRIOR ART) LIQUID CRYSTAL MASK DISPLAY SWITCHING
FIG. 6(b) (PRIOR ART) Y DEFLECTION MIRROR

LIQUID CRYSTAL DISPLAY FOR LASER MARKER

TECHNICAL FIELD

The present invention relates to systems for displaying a pattern on a liquid crystal for a laser marker and more particularly, to a system for performing predetermined control over switching of display to attain high speed marking.

BACKGROUND ART

For a technique for applying liquid crystal made from so-called high polymer compound to a mask for a laser marker, the applicant of the present application has already filed patent applications (Japanese Patent Application No. 3-224916, etc.).

In such a high polymer compound type liquid crystal, when it is desired to switch the display screen of the liquid crystal, i.e., a marking pattern, this is attained, for the purpose of preventing from an after-image at the time of the switching of display, by performing such non-display processing that grounds row and column electrodes provided for the respective pixels of the liquid crystal and then by applying predetermined voltages to the row and column electrodes. In this case, ones of the pixels subjected to no application of such voltages are put in their laser-beam scattering state while the other pixels subjected to the application of the voltages are put in their laser-beam transmission state.

However, the above display switching operation is not instantaneously carried out and requires a time of about 60 msec. Accordingly, during this display switching time, the liquid crystal is put in its non-display state and the marking is not performed, hence this time period becomes a wasteful time in operation. In addition, such switching of the display screen is generally continually done and pattern marking operation is often continuously done. In this case, since the above switching time is required whenever the pattern is changed, such switching time is accumulated for each pattern change to reach a lot of loss time when viewed from the entire operation, which hinders realization of high-speed marking.

An invention for realizing high-speed marking is disclosed, for example, in Japanese Patent Application Laid-Open Publication No. 2-268988, in which the display surface of a liquid crystal mask for a laser marker is divided into 2 upper and lower sections so that, when scanning for the upper half is completed and then scanning starts for the lower half, rewriting is carried out for a marking pattern of the upper half.

This invention, however, fails to positively describe such processing as to put only the upper half display in its non-display state during the display switching operation of the upper half display. Therefore, when the invention is applied to a laser marker with use of the aforementioned high polymer compound type liquid crystal as it is, this disadvantageously involves generation of an after-image.

When analyzed, the liquid crystal switching time is roughly divided into a time necessary for extinguishing the pattern being displayed and a time necessary for activating a new display pattern. Between these times, the displayed-pattern extinguishment time, which depends on the composition material, structure, etc. of the liquid crystal mask, cannot be easily shortened.

For this reason, for the purpose of realizing high-speed marking, when the marking operation is started before the liquid crystal display appears, irregularities take place in the marking on a workpiece. Accordingly, there has been a limit in realizing higher-speed marking while maintaining the marking quality.

In view of such circumstances as mentioned above, it is a first object of the present invention to realize high-speed marking for a laser marker with use of, in particular, a high polymer compound type liquid crystal while preventing generation of an after-image.

A second object of the present invention is to attain high-speed marking while maintaining the marking quality.

DISCLOSURE OF THE INVENTION

In accordance with a first invention of the present invention, there is provided a liquid crystal display for a laser marker wherein row and column electrodes are provided for each of pixels of a liquid crystal, the row and column electrodes are grounded and then predetermined voltages are applied to the row and column electrodes to perform switching of display of a liquid crystal display screen, a laser beam is irradiated on the liquid crystal display screen and scanned on the liquid crystal display screen to mark a predetermined pattern displayed on the liquid crystal display screen onto a target object, and which comprises a display switching means for dividing the liquid crystal display screen into a first zone to be firstly subjected to a sub-scanning operation and a second zone to be subjected to a sub-scanning operation following the first zone, for performing switching operation of the display over the first and second zones independently of each other, and for grounding the row and column electrodes and then applying the predetermined voltages to the row and column electrodes; a position detecting means for detecting a position of the liquid crystal display screen at which the sub-scanning is being presently carried out; and a means for controlling the display switching means to perform switching operation of display of the first zone when the position detecting means detects completion of the sub-scanning of the first zone and to perform switching operation of display of the second zone when the position detecting means detects completion of the sub-scanning of the second zone.

With such an arrangement, the liquid crystal display screen is divided into the first zone to be firstly subjected to the sub-scanning operation and the second zone to be subjected to the sub-scanning operation following the first zone, switching operation of the display is performed over the first and second zones independently of each other, and the row and column electrodes are grounded and then the predetermined voltages are applied to the row and column electrodes. The completion of the sub-scanning of the first zone is detected by the position detecting means, at which time the switching of display of the first zone is independently carried out. The completion of the sub-scanning of the second zone is detected by the position detecting means, at which time the switching of display of the second zone is independently carried out.

In accordance with a second invention of the present invention, there is provided a liquid crystal display for a laser marker in which row and column electrodes are provided for each of pixels of a liquid crystal, the row and column electrodes are grounded and then predetermined effective voltages (root-mean-square voltages) are applied to the row and column electrodes to perform switching of display of a liquid crystal display screen, and in which effective voltages larger than the predetermined effective voltages are applied to the electrodes only for a predetermined period of time after starting application of the voltages to the voltages and the predetermined effective voltages are applied to the voltages after passage of the predetermined period of time.

With such an arrangement, since the effective voltage to be applied to the liquid crystal is set at a high level only for the predetermined period of time after starting application of the voltage and is set at such a level as to provide a predetermined transmission factor after the passage of the predetermined period of time, a liquid crystal activation response time can be shortened.

BRIEF DESCRIPTION OF THE DRAWINGS

FIGS. 4(a) through 4(c) show timing charts for explaining the operation of the system of FIG. 1;

FIGS. 6(a) through 6(c) show timing charts for explaining the operation based on a prior art laser marker;

BEST MODE FOR CARRYING OUT THE INVENTION

Embodiments of a liquid crystal display for a laser marker in accordance with the present invention will be explained with reference to the accompanying drawings. Explanation will first be directed to a first embodiment.

Figure 1:
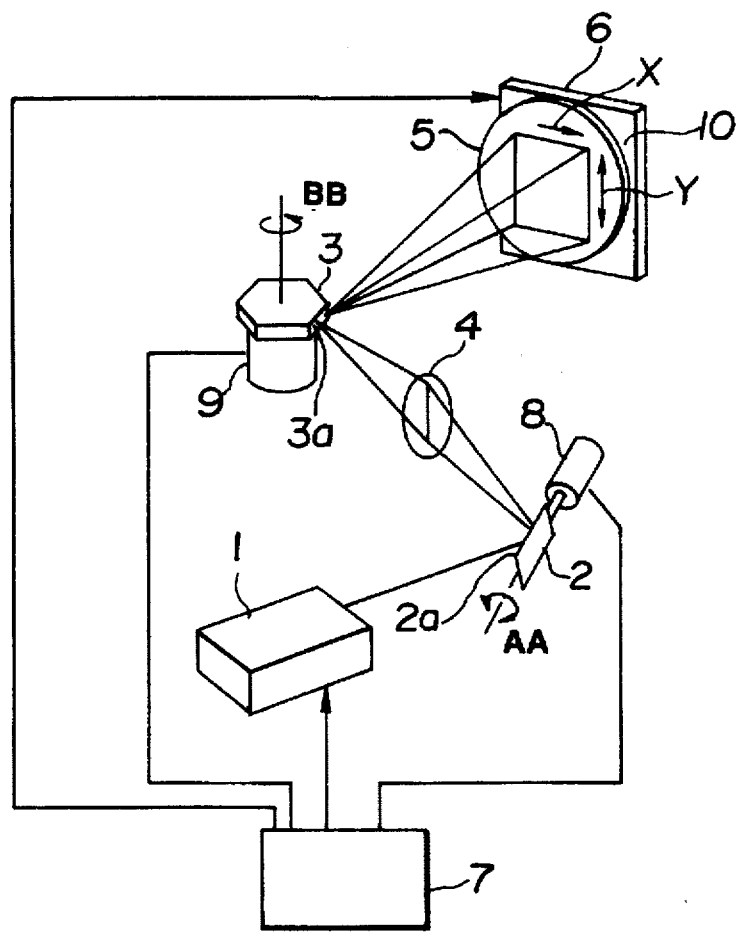
FIG. 1 shows an arrangement of a liquid crystal display screen switching system for a laser marker in accordance with an embodiment of the present invention.

FIG. 1 conceptionally shows an arrangement of a laser marker in the first embodiment.

In the drawing, a laser oscillator 1 oscillates to issue a scanning laser beam (such as a YAG (yttrium aluminum garnet) laser beam), which oscillated laser beam is irradiated on a reflective surface 2a of a deflector 2. A laser beam reflected by the reflective surface 2a is illuminated or irradiated on a reflective surface 3a of a deflector 3 made in the form of a polygon mirror through a lens 4. The laser beam reflected from the reflective surface 3a is illuminated or irradiated on a liquid crystal display screen 10 of a high polymer compound type liquid crystal mask 6 via a lens 5.

Figure 2:
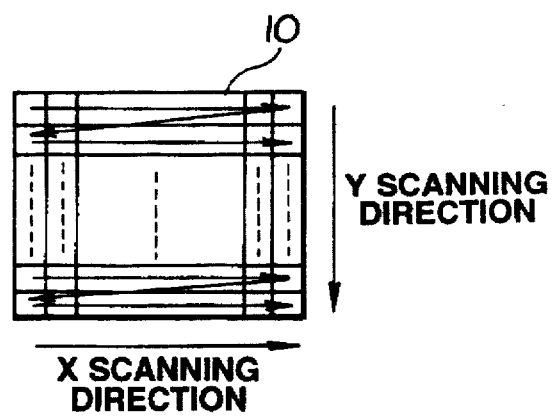
FIG. 2 is a diagram for explaining how a laser beam scans a liquid crystal display screen shown in FIG. 1.

The reflective surface 2a of the deflector 2 is rotated in a direction shown by an arrow AA by a motor 8, and the reflective surface 3a of the deflector 3 is rotated in a direction shown by an arrow BB by a motor 9. Accordingly, when the drive control of the motor 9 causes rotation of the reflective surface 3a in the arrow BB direction, the laser beam main-scans the liquid crystal display screen 10 of the liquid crystal mask 6 in a direction shown by an arrow X; while, when the drive control of the motor 8 causes rotation of the reflective surface 2a in the arrow AA direction, the laser beam sub-scans the liquid crystal display screen 10 of the liquid crystal mask 6 in a direction shown by an arrow Y. The manner the laser beam scans the liquid crystal display screen 10 is shown by arrows in FIG. 2.

A controller 7 controls the driving operations of the above motors 8 and 9, controls the laser oscillation of the laser oscillator 1, and outputs a signal for driving the pixels of the liquid crystal display screen 10 of the liquid crystal mask 6.

The controller 7, on the basis of information on a marking pattern entered through a predetermined input means, outputs a signal for driving associated ones of the pixels of the liquid crystal display screen 10 of the liquid crystal mask 6 corresponding to the pattern. In response to this, the associated pixels on the liquid crystal display screen 10 of the liquid crystal mask 6 are driven. Then the control of the driving operations of the motors 8 and 9 as well as the control of the operation of the laser oscillator 1 cause a laser beam to be scanned so that the laser beam transmits only the driven pixels and passes through a predetermined optical system (not shown), whereby a character, figure, etc. corresponding to a shape (the shape of the marking pattern) of the driven pixels are marked, e.g., on a surface of such a work 13 as shown in FIG. 5.

Figure 5:
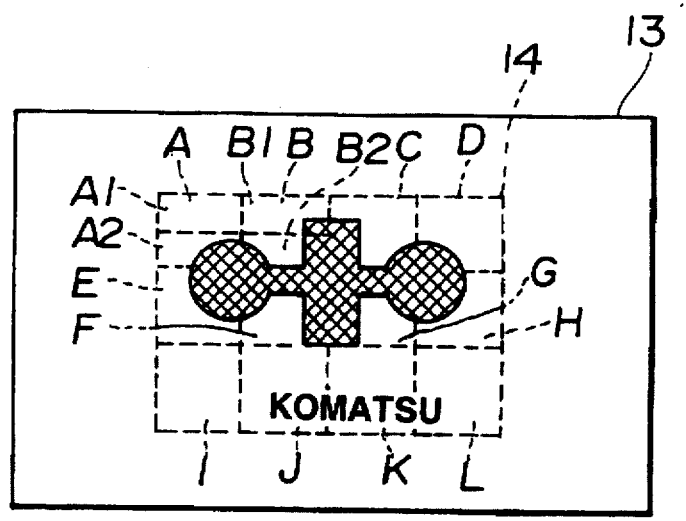
FIG. 5 shows an example of a pattern marked through the system of FIG. 1.

More specifically, as shown in FIG. 5, a pattern 14 to be marked is divided into a plurality of marking patterns of blocks A to L so that the system of the present embodiment performs sequential marking operation over the respective marking patterns of the blocks. Accordingly, it is necessary to sequentially switch the pixel to be driven on the liquid crystal display screen 10 on a block basis of the blocks A to L.

Figure 3:
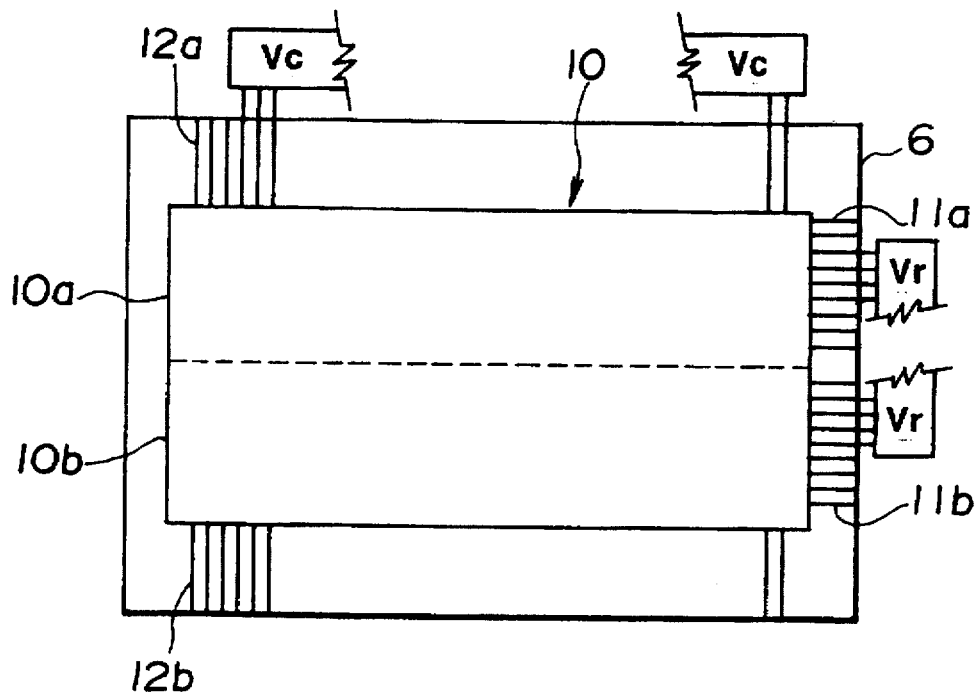
FIG. 3 is a diagram for explaining an arrangement of a liquid crystal mask shown in FIG. 1.

Shown in FIG. 3 is details of an arrangement of the liquid crystal mask 6 in which the liquid crystal display screen 10 is made up of pixels arranged in the form of 72 (rows)×36 (column) dots. More in detail, the pixels are divided into two, that is, an upper screen zone 10a of 72×18 dots and a lower screen zone 10b of 72×18 dots, as shown by a broken line in the drawing. In this connection, the division means that the upper screen zone 10a and lower screen zone 10b are driven (displayed) or non-driven (not displayed) independently of each other.

More specifically, each of the pixels comprises a row electrode and a column electrode. When predetermined voltages Vr and Vc (FIG. 3) are applied to the respective row and column electrodes, the display is effected. Upon display switching, the respective electrodes are grounded so that the display is put in its non-display state. Connected to the respective electrodes are signal lines so that the controller 7 outputs a control signal to vary voltages of the electrodes to predetermined levels, thereby realizing such displaying and non-displaying operations as mentioned above. The present embodiment is arranged so that the electrodes and signal lines are divided into two groups, that is, one (upper row electrodes/signal lines 11a and upper column electrodes/signal lines 12a) for the upper screen zone 10a and the other (lower row electrodes/signal lines 11b and lower column electrodes/signal lines 12b) for the lower screen zone 10b, so that the displaying and non-displaying operations are carried out on the basis of the control signal issued from the controller 7 independently of each other for each of the upper and lower screen zones 10a and 10b.

A sub-scanning position on the liquid crystal display screen 10 is detected by the controller 7 per se on the basis of a drive control signal issued from the controller 7 to the motor 8 for the sub-scanning. Thus, the controller 7, on the basis of the control signal, can judge whether the laser beam is then sub-scanning the upper screen zone 10a or sub-scanning the lower screen zone 10b, and can detect a time point at which the sub-scanning is shifted from the upper screen zone 10a to the lower screen zone 10b after completion of the sub-scanning of the upper screen zone 10a.

In this way, the system can detect a sub-scanning position of the laser beam on a software basis on the basis of the control signal issued to the motor 8, which makes it unnecessary to provide such a special sensor that directly receives a YAG laser beam having a high intensity for position detection, with the result of the fact that the system can be advantageously reduced in cost.

The operation of the controller 7 will be explained by referring to such a timing chart as shown in FIG. 4.

FIG. 4(a) shows how upper parts A1, B1, . . . of the respective blocks A, B, . . . (refer to FIG. 5) are sequentially displayed on the upper screen zone 10a while subjected to the non-displaying operation with respect to the varying patterns, FIG. 4(b) shows how lower parts A2, B2, . . . of the respective blocks A, B, . . . (refer to FIG. 5) are sequentially displayed on the lower screen zone 10b while subjected to the non-displaying operation with respect to the varying patterns, and FIG. 4(c) shows how to main-scan the display screen at a predetermined Y position with the reflective surface 2a of the deflecting mirror or deflector 2 being fixed and how to sub-scan the display screen with the Y deflecting mirror being rotated (which rotation timing is shown by vertical lines) and with the Y position being moved.

The above operation will be sequentially explained in more detail in the following. At a time point t1, when the sub-scanning of the upper screen zone 10a is completed and the marking operation of the upper part A1 of the block A is completed, which completion time point is detected by the controller 7, so that, in order to perform display switching from the block A to the next block B as shown by an arrow (1), the controller 7 controls to put the upper screen zone 10a in its non-displayed state, that is, the row and column electrodes of the pixels of the upper screen zone 10a are grounded. This enables prevention of an after-image. At a time point t2, display of the upper part B1 of the block B is activated, after which display activation time the upper part B1 of the block B is displayed on the upper screen zone 10a at a time point t3.

With respect to the lower screen zone 10b, on the other hand, the lower part A2 of the block A is already activated from a time point t0 earlier than the time point t1 and thus the lower part A2 is scanned continuously from the time point t1 at which the marking of the lower part A2 is carried out. Subsequently, when the sub-scanning of the lower screen zone 10b is completed and the marking of the lower part A2 of the block A is completed at the time point t3, the controller 7 detects the then completion time point and puts the lower screen zone 10b in the non-displayed state, that is, grounds the row and column electrodes of the pixels of the lower screen zone 10b to perform display switching from the block A to the next block B as shown by an arrow (2). As a result, any after-image can be prevented. At a time point t4, display of the lower part B2 of the next block B is activated, after which display activation time the lower part B2 of the block B is displayed on the lower screen zone 10b.

At the time point t3, display corresponding to one screen of block A is established and thus the marking pattern corresponding to the block A is marked on the work 13. However, display of the next block B (upper part B1) is already displayed on the upper screen zone 10a at the time point t3. This means that the marking is carried out continuously. In this way, the marking operation can be shifted to the next pattern without any intermittence and thus high-speed marking can be realized.

Thereafter, in the same manner, the marking of the block B from the upper part B1 to the lower part B2 is continuously carried out at a time point t5, and then the marking from the block B to the next block C can be continuously carried out without any intermittence at a time point t6. In this way, the blocks A to L are marked without any waste time, which leads to the fact that the entire pattern 14 can be marked on the work 13 at a high speed.

In the prior art, by contrast with the present invention, after the marking of the block A is done, as shown in FIG. 6, the entire display screen is put in its non-displayed state as shown by an arrow (1) so that sub-scanning is paused for a duration ΔT' before the next block B is displayed. This means that there occurs a waste time corresponding to the duration ΔT', during which no marking is carried out.

In the present embodiment, it will be appreciated that, as shown in FIG. 4, since no such waste time takes place, the present embodiment can realize high-speed marking over prior art. In addition, whenever the display screen is switched (the display screen is switched between the upper and lower screen zones), the screen is put in its non-displayed state. For this reason, any after-image can also be prevented and thus the present embodiment can be suitably applied to a laser marker which uses high polymer compound type liquid crystal.

Explanation will next be made as to a second embodiment.

In the second embodiment, unlike the first embodiment, not a liquid crystal display screen is switched between its upper and lower screen zones but the entire liquid crystal display screen is switched at a time.

The device of this embodiment is assumed to be the same to the device of the embodiment 1.

When analyzed, the liquid crystal switching time is roughly divided into a time (corresponding to a "GROUNDING PERIOD" in FIG. 4) necessary for extinguishing the pattern being displayed and a time (corresponding to "DISPLAY ACTIVATION PERIOD" in FIG. 4) necessary for activating a new display pattern. Between these times, the displayed-pattern extinguishment time, which depends on the composition material, structure, etc. of the liquid crystal mask, cannot be easily shortened. Thus, for the purpose of removing the above difficulty, it is necessary to shorten the liquid crystal display activation time. For example, as described in a book entitled "Liquid Crystal Applications", written by Okano and Kobayashi, p85, published by Baifuukan, 1985; transmission factor for liquid crystal is determined by an effective voltage value applied thereto.

The effective voltage is defined as the following equation (1).

$$\text{Vrms} = \left( 1/T \int_o^T V^2(t)dt \right)^{1/2} \quad (1)$$

where V(t) denotes an applied voltage waveform, T denotes a period of the applied voltage waveform, and Vrms denotes the effective voltage (root-mean-square voltage).

Hence, when the effective voltage applied to the pixels of the liquid crystal is set at a high level for a short time after display is started while set at such a level as to provide a predetermined transmission factor after passage of a predetermined time, the liquid crystal activation response time can be shortened.

When it is desired to drive the liquid crystal mask by a multiplex method, since the voltage is applied also to pixels acting as shutters, continuous application of a high effective voltage undesirably results in that the shutter pixels starts exhibiting its transmission property. Since the transmission factor is 0% at the time of starting display and a change in the transmission factor of the shutter pixels requires a time, even application of a high effective voltage will not lead to the fact that the shutters start exhibiting transmission property, whereby the display activation time of the transmission pixels can be made short. And since the effective voltage is decreased to a predetermined level after passage of the predetermined time (more concretely, at the time of exhibiting), the shutter pixels cannot transmit light therethrough.

Meanwhile, since display of the transmission pixels is activated with the high effective voltage, the display activation time can be shortened. When the aforementioned invention is applied to a transmission type liquid crystal mask for blocking a laser beam, the conditions so far used can be used as they are while preventing the marking quality from being deteriorated and therefore there can be fabricated a laser marker which has a short marking time.

Figure 8:
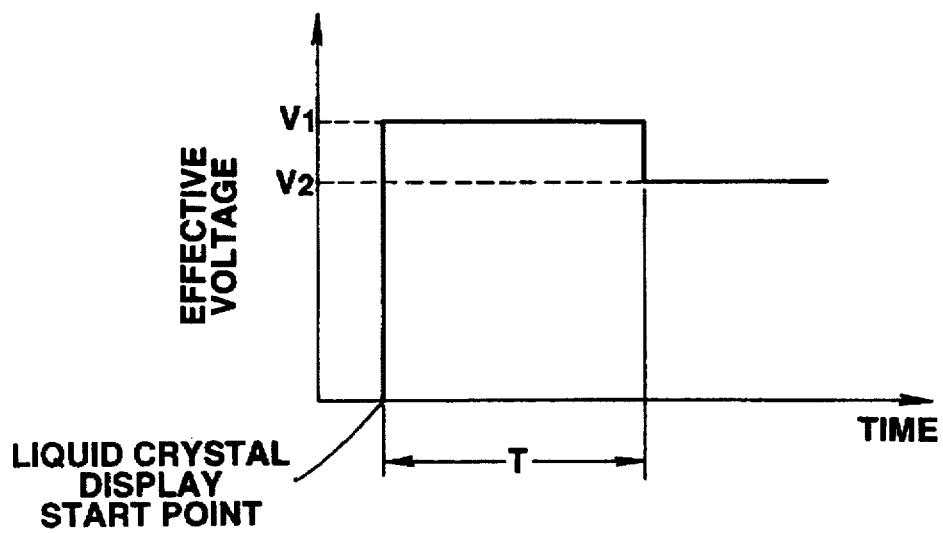
FIG. 8 is a graph showing a relationship between the time and execution voltage in the other embodiment of the present invention.

More specifically, such a command is issued from the controller 7 that, as shown in FIG. 8, the effective voltage to be applied from the controller 7 to the mask 6 is set at a high level (V1) for a short time (T) after starting the display and then reduced to a predetermined level (V2) after passage of the predetermined time (T) (more concretely, at the timing when the transmission pixels exhibit sufficient transmission factor before the shutter pixels exhibit their transmission property).

Figure 7:
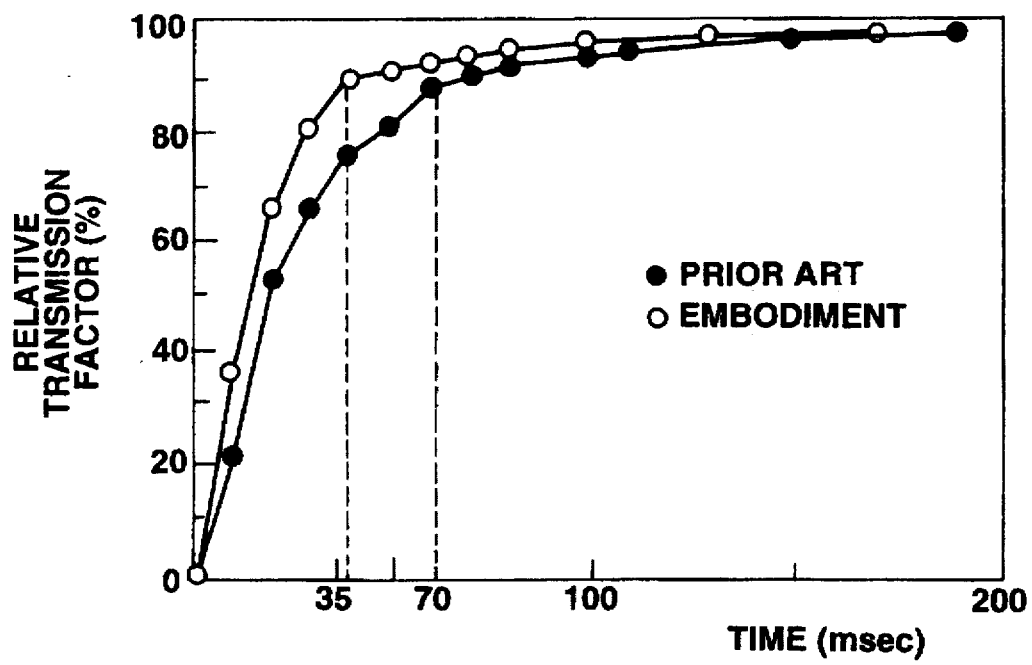
FIG. 7 is a graph showing a difference in the response characteristic between a liquid crystal in another embodiment of the present invention and a prior art liquid crystal.

FIG. 7 shows a response characteristic in a display start mode when such control is carried out. Illustrated data were measured at an environmental temperature of 20° C. and the liquid crystal driving voltage V2 was 11 Vrms. Measurement was conducted for comparison between the case where the driving voltage in the liquid crystal display activation mode is 11 Vrms that is the same as the set value V2 and the case where the driving voltage is set to have the voltage V1 of 12.1 Vrms, which is 10% greater than V2, for 40 msec. and thereafter to have the voltage V2 of 11 Vrms.

It will be seen from FIG. 7 that the display activation time is reduced. Our analysis has showed that the time necessary for the transmission factor to change from 0% to 90% is 35 msec. in the case of the application of the present second embodiment, while it is required 70 msec. in the prior art. As a result, even when marking speed was made high, there can be obtained such an effect that no irregularity takes place on the marking surface of a workpiece to be processed.

INDUSTRIAL APPLICABILITY

As has been explained in the foregoing, in accordance with the present invention, since switching of the liquid crystal display screen is carried out between the different zones of the display screen and the zones are put in the grounded state independently of each other at the time of the switching, creation of any after-image can be prevented and high-speed marking can be attained.

Further, in accordance with the present invention, since an effective voltage to be applied to the liquid crystal is set to be high for a predetermined time after starting the display and reduced to a predetermined level after passage of the predetermined time; display of transmission pixels can be activated with the high effective voltage and the display activation time can be shortened. Thus, the conditions so far used can be used as they are while preventing the marking quality from being deteriorated and the marking time can be shortened to a large extent.

We claim:

1. A liquid crystal display device for a laser marker in which, when changing display of a liquid crystal display screen provided with row and column electrodes for each of pixels, shifting is effected to a display period in which a predetermined effective voltage potential value is applied respectively to the row electrodes and the column electrodes after passage of a non-display period in which voltage potentials of the row and column electrodes are made identical, wherein the liquid crystal display device comprises:

a controller which outputs a voltage potential command value to the liquid crystal in such a manner that, an effective voltage potential value greater than the predetermined effective voltage potential value is applied to the row and column electrodes for a predetermined time of an initial stage of the display period in which a transparent rate of display pixels reaches a predetermined voltage potential value and a transparent rate of non-display pixels does not reach the predetermined voltage potential value, and the predetermined effective voltage potential value is applied to the row and column electrodes from a time point when the predetermined time elapsed until a time point when the display period ends.

2. A liquid crystal display for a laser marker wherein row and column electrodes are provided for each of pixels of a liquid crystal, during a display period a first voltage potential is applied to the row electrodes and a second voltage potential is applied to the column electrodes to thereby create the display and during a non-display period voltage potentials of the row and column electrodes are substantially identical, and predetermined voltage potentials are applied to the row and column electrodes to perform switching of display of a liquid crystal display screen, a laser beam is irradiated on the liquid crystal display screen and scanned on the liquid crystal display screen to mark a predetermined pattern displayed on the liquid crystal display screen onto a target object, the liquid crystal display comprising:

display switching means for dividing the liquid crystal display screen into a first zone to be firstly subjected to a sub-scanning operation and a second zone to be subjected to a sub-scanning operation following the first zone, for performing switching operation of the display over the first and second zones independently of each other, and for grounding the row and column electrodes for the first and second zones respectively and then applying the predetermined voltage potentials to the row and column electrodes;

said display switching means being further constructed and arranged for starting the display of the second zone from a time $t_0$ prior to a display end time $t_1$, of the first zone and prior to a time period necessary for activating the display and, for starting the display of the first zone from a time $t_2$ prior to a display end time $t_3$ of the second zone and prior to a time period necessary for activating the display;

position detecting means for detecting a position on the liquid crystal display screen at which the sub-scanning is being carried out; and means for controlling the display switching means to perform switching operation of display of the first zone when the position detecting means detects completion of the sub-scanning of the first zone and to perform switching operation of display of the second zone when the position detecting means detects completion of the sub-scanning of the second zone.

3. The liquid crystal display for a laser marker as set forth in claim 2, wherein the sub-scanning is carried out by irradiating the laser beam and rotating a light reflector for reflection of the laser beam to thereby change a reflection direction of the laser beam, and the position detecting means detects the position of the sub-scanning on the basis of a rotation command signal for the mirror.

* * * * *